United States Patent [19]
Nagai et al.

[11] Patent Number: 5,349,268
[45] Date of Patent: Sep. 20, 1994

[54] HIGH VOLTAGE DISCHARGE LAMP DEVICE

[75] Inventors: Satoshi Nagai; Hiroyasu Kisaichi; Hiroyoshi Yamazaki, all of Kanagawa, Japan

[73] Assignee: Mitsubishi Denki Kabushiki Kaisha, Tokyo, Japan

[21] Appl. No.: 132,227

[22] Filed: Oct. 6, 1993

Related U.S. Application Data

[63] Continuation of Ser. No. 889,975, May 29, 1992, abandoned.

[30] Foreign Application Priority Data

Jan. 27, 1992 [JP] Japan .................. 4-012044

[51] Int. Cl.$^5$ .................................. H05B 37/00
[52] U.S. Cl. ................... 395/160; 315/205; 315/219; 315/246; 315/DIG. 5; 315/DIG. 7
[58] Field of Search ........... 315/205, DIG. 7, DIG. 5, 315/194, 246, 209 R, 210, 219, 160

[56] References Cited

U.S. PATENT DOCUMENTS

| | | | |
|---|---|---|---|
| 2,810,862 | 10/1957 | Smith | 315/205 |
| 3,789,266 | 1/1974 | Polman et al. | 315/DIG. 7 |
| 5,189,343 | 2/1993 | Pacholok | 315/DIG. 5 |

FOREIGN PATENT DOCUMENTS

| | | |
|---|---|---|
| 1943870 | 3/1970 | Fed. Rep. of Germany . |
| 3445817 | 12/1988 | Fed. Rep. of Germany . |
| 2-136343 | 5/1990 | Japan . |
| 2030388 | 4/1980 | United Kingdom . |

*Primary Examiner*—Robert J. Pascal
*Assistant Examiner*—Michael B. Shingleton
*Attorney, Agent, or Firm*—Burns, Doane, Swecker & Mathis

[57] ABSTRACT

A high voltage discharge lamp device may include a step-up DC-DC converter connected to a power switch; polarity switching elements for alternatively changing the polarities of the electric voltage outputted from the step-up DC-DC converter; and a polarity switching drive circuit for activating the polarity switching elements. Also, a high voltage discharge lamp device may include a pair of first and second step-up DC-DC converters connected to a power switch; polarity switching elements for alternatively changing the output polarities of the respective first step-up DC-DC converter and the second step-up DC-DC converter; and a polarity switching drive circuit for activating the polarity switching elements. The polarity switching drive circuit operates in synchronization with the on/off actions of the power switch, or in synchronization with either ultra low-frequency signals or low-frequency signals.

8 Claims, 14 Drawing Sheets

FIG. 11(A) TRANSISTOR 33a
FIG. 11(B) VOLTAGE CHARGED IN THE CONDENSER 35a
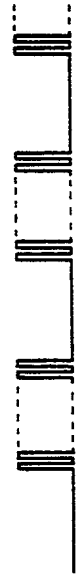
FIG. 11(C) TRANSISTOR 33b
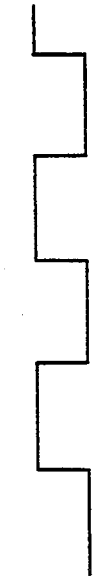
FIG. 11(D) VOLTAGE CHARGED IN THE CONDENSER 35b
FIG. 11(E) TRANSISTOR 4b
FIG. 11(F) TRANSISTOR 4a
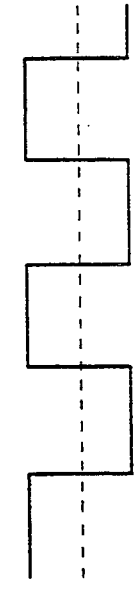
FIG. 11(G) VOLTAGE APPLIED TO THE DISCHARGE 6

FIG. 16 PRIOR ART
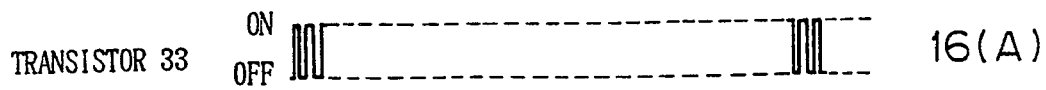
TRANSISTOR 33   ON/OFF    16(A)
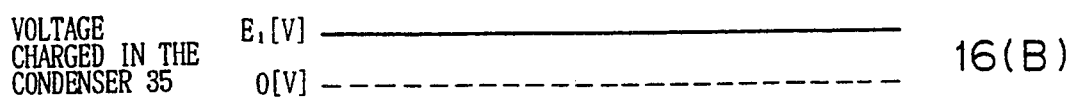
VOLTAGE CHARGED IN THE CONDENSER 35   $E_1$[V] / 0[V]    16(B)
TRANSISTOR 41, 44   ON/OFF    16(C)
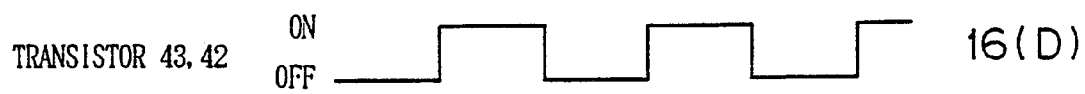
TRANSISTOR 43, 42   ON/OFF    16(D)
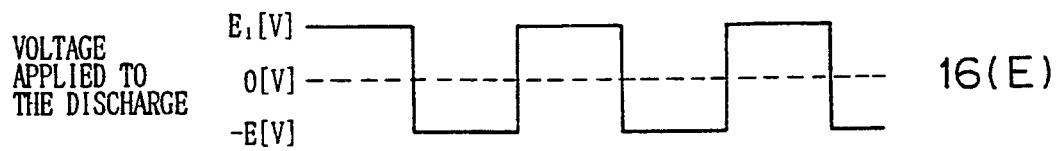
VOLTAGE APPLIED TO THE DISCHARGE   $E_1$[V] / 0[V] / $-E$[V]    16(E)

HIGH VOLTAGE DISCHARGE LAMP DEVICE

This application is a continuation of application Ser. No. 07/889,975, filed May 29, 1992, now abandoned.

BACKGROUND OF THE INVENTION

1. Field of the Invention

The present invention relates to a high voltage discharge lamp device, and more specifically to a simplification of the construction thereof.

2. Description of the Prior Art

Conventionally, various high voltage discharge lamp devices have been disclosed. Some of those devices are formed with structures as respectively shown in FIGS. 13 and 14, wherein FIG. 13 is a block diagram of a first embodiment according to the conventional art. In the figure, when a power switch 2 is closed, that is when the power switch is set to on, a voltage generated by a battery 1 is fed to a step-up DC-DC converter 3, and the stepped-up direct voltage generated therein is further fed to an inverter circuit 4 so as to supply an alternating voltage to an igniter circuit 5-1 therefrom. The high voltage generated at the igniter circuit 5-1 is applied to a high voltage discharge lamp 6 and induces a discharge in the gas enclosed in the discharge lamp, whereby the high voltage discharge lamp 6 is lit by the alternating voltage supplied from the inverter circuit 4. A control circuit 7-1, after the high voltage discharge lamp device 6 is lit, adjusts the output voltage of the step-up DC-DC converter 3 and thus controls the electric power to be fed to the high voltage discharge lamp 6 so the high voltage discharge lamp provides a constant illumination.

FIG. 14 shows a block diagram of a second embodiment according to conventional art. In the figure, when the power switch 2 is closed, a voltage generated by a battery 1 is fed to a step-up DC-DC converter 3, and the stepped-up direct voltage produced therein is further fed to an inverter circuit 4 so as to supply an alternating voltage to an igniter circuit 5-2 therefrom. The high voltage generated at the igniter circuit 5-2 is applied to a high voltage discharge lamp 6 and induces a discharge in the gas enclosed in the discharge lamp, whereby the alternating voltage supplied from the inverter circuit 4 by way of coils 10a and 10b lights the high voltage discharge lamp 6. These coils 10a and 10b prevent the discharge inception voltage generated in the igniter circuit 5-2 from flowing back to the inverter circuit 4. A control circuit 7-2, after the high voltage discharge lamp device 6 is lit, adjusts the output voltage of the step-up DC-DC converter 3 and thus controls the electric power fed to the high voltage discharge lamp 6 so the high voltage discharge lamp provides a constant illumination.

FIG. 15 shows a detailed circuit construction of the step-up DC-DC converter 3 and the inverter circuit 4 disclosed in FIG. 14, wherein a condenser 31 and the primary winding of a transformer 32 together form a resonance circuit, and a transistor 33 is alternatively switched at a high frequency by the control circuit 7-2, so that the stepped-up high-frequency voltage is outputted from the secondary winding of the transformer 32. A diode 34 and a condenser 35 from a smoothing circuit which converts the high-frequency voltage fed from the transformer 32 to a DC voltage. Transistors 41, 42, 43 and 44 are connected in a bridge circuit to form an inverter circuit 4, and the respective base terminals thereof are connected to an oscillating circuit 46 by a driver circuit 45. The oscillating circuit 46 generates a low-frequency signal (400 Hz). The resistors 61 and 62 are connected to limit the current flowing into the high voltage discharge lamp device 6.

FIG. 16 shows a timing chart showing an operation of each of the circuits shown in FIG. 15, wherein FIG. 16(A) represents a waveform of the transistor 33, and an output voltage of the step-up DC-DC converter 3 is determined by an ON/OFF ratio of this transistor 33. FIG. 16(B) represents an electric voltage charged in the condenser 35, that is an output voltage of the step-up DC-DC converter 3. FIG. 16(C) represents on/off states of the transistors 41 and 44 which are activated in synchronization with the output of the oscillating circuit 46. FIG. 16(D) represents equally on/off states of the transistors 43 and 42, so that when the transistor 41 of the power supply side is on, then the transistor 44 of the ground side is set to on, and conversely, when the transistor 43 of the power supply side is on, then the transistor 42 of the ground side is set to on. FIG. 16(E) represents a voltage applied to the high voltage discharge lamp 6, and it is noted thereby that an alternating voltage of a low-frequency wave is applied to the high voltage discharge lamp in this manner.

Generally it is impossible to activate a high voltage discharge lamp by a direct voltage due to the fact that it likely causes damage to the electrode of the discharge lamp, and for this reason, the direct voltage is converted to an alternating voltage by an inverter circuit and then supplied to the discharge lamp as shown in the first and second embodiment of the conventional art. However, the fact remains that the manufacturing cost thereof may be high since the inverter circuit requires a power switching element of a high output level, and a specific circuit is required to activate this switching element.

SUMMARY OF THE INVENTION

The present invention has been made to eliminate such problems as described above. It is an object of the present invention to provide a high voltage discharge lamp device of simple construction and substantially low manufacturing cost which does not require an inverter circuit. In order to attain the above object, the present invention provides a circuit which comprises a polarity switching means for alternatively changing the polarities of the direct voltage supplied to the high voltage discharge lamp between the step-up DC-DC converter and the high voltage discharge lamp.

The present invention is constructed according to a first embodiment in a manner wherein a high voltage discharge lamp device comprises: a step-up DC-DC converter connected to a power switch; polarity switching means for alternatively changing the polarities of the electric voltage outputted from the step-up DC-DC converter; and a polarity switching means drive circuit for activating the polarity switching means. According to a second embodiment a high voltage discharge lamp device comprises: a pair of first and second step-up DC-DC converters connected to a power switch; polarity switching means for alternatively changing the output polarities of the respective first step-up DC-DC converter and that of the second step-up DC-DC converter; and a polarity switching means drive circuit for activating the polarity switching means. The polarity switching means drive circuit operates in synchronization with on/off actions of the power switch, or in synchronization with either ultra low-frequency signals or low-frequency signals.

In other words, although the output voltage from the step-up DC-DC converter is basically fed to the high voltage discharge lamp with the polarities alternatively switched in accordance with the above construction, the mode for the polarity switching means activating circuit to drive the polarity switching means can be variably arranged such as in synchronization with on/off actions of the power switch, with ultra low-frequency signals, or with low-frequency signals.

Other objects and features of the invention will be more fully understood from the following detailed description of the appended claims when taken in conjunction with the accompanying drawings.

BRIEF DESCRIPTION OF THE DRAWINGS

FIG. 11 is a timing chart showing the operation of each of the component circuits of FIG. 10;

FIG. 16 is a timing chart showing the operation of each of the component circuits of FIG. 15.

DETAILED DESCRIPTION OF THE PREFERRED EMBODIMENTS

In the following, several embodiments of the present invention are described with reference to the accompanying drawings.

Figure 1:
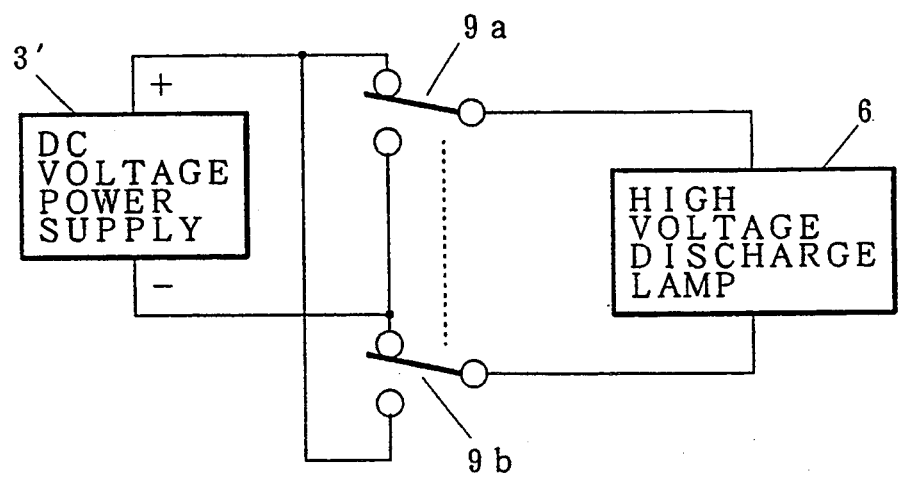
FIG. 1 is an illustration showing a general construction of a first embodiment according to the present invention.

FIG. 1 is an illustration showing a high voltage discharge lamp device, wherein the output polarities of the DC power supply 3' are alternatively changed by the polarity switching means 9a and 9b which are move simultaneously, and then fed to the high voltage discharge lamp 6.

Figure 2:
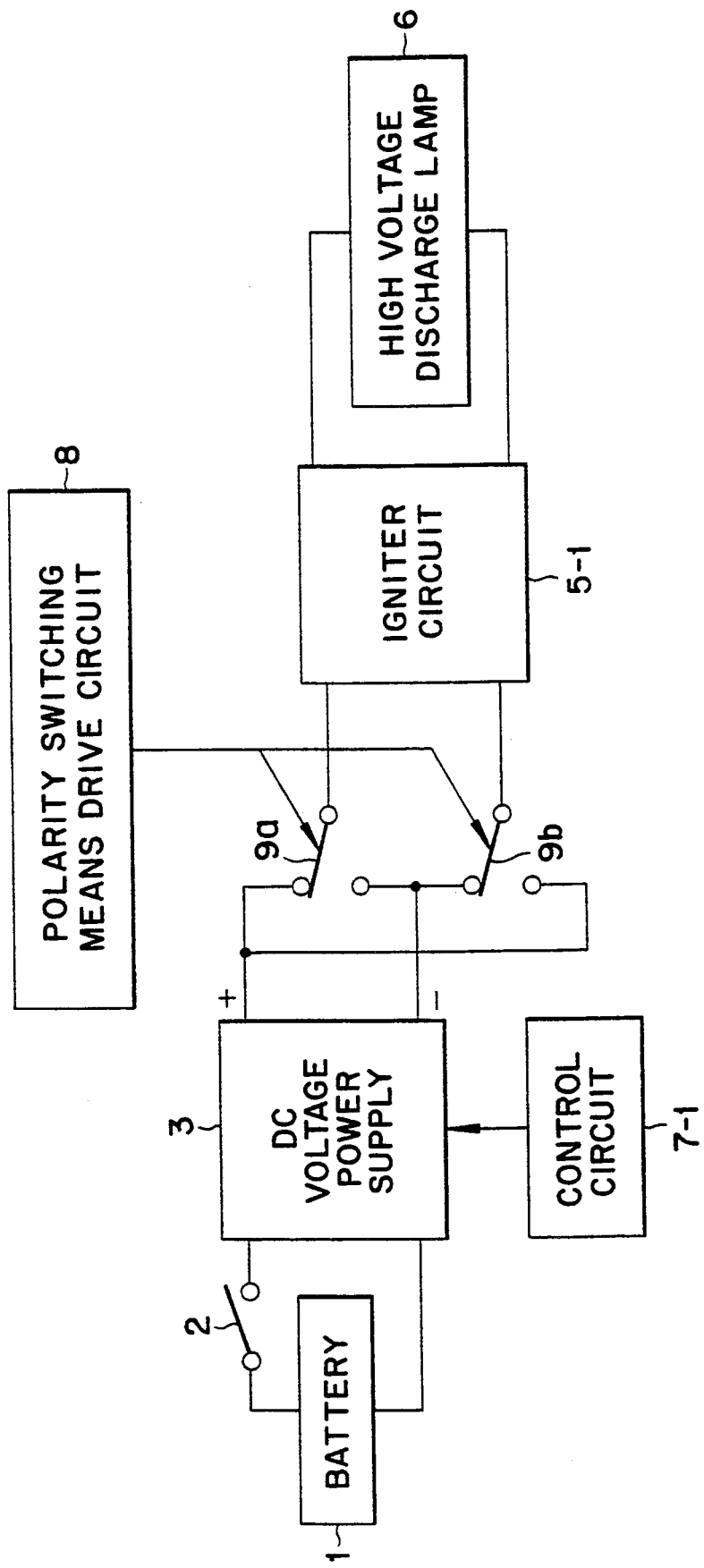
FIG. 2 is a block diagram of the first embodiment.
Figure 3:
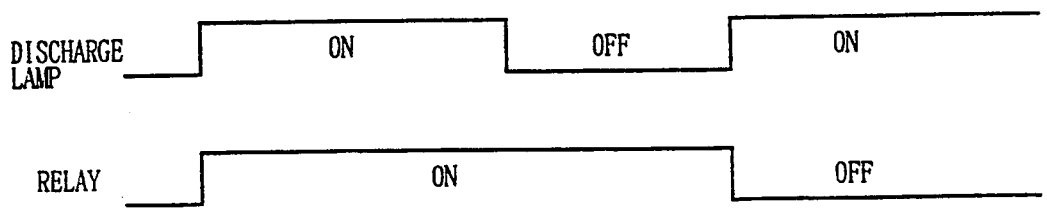
FIG. 3 is a timing chart showing an operation of the first embodiment.
Figure 13:
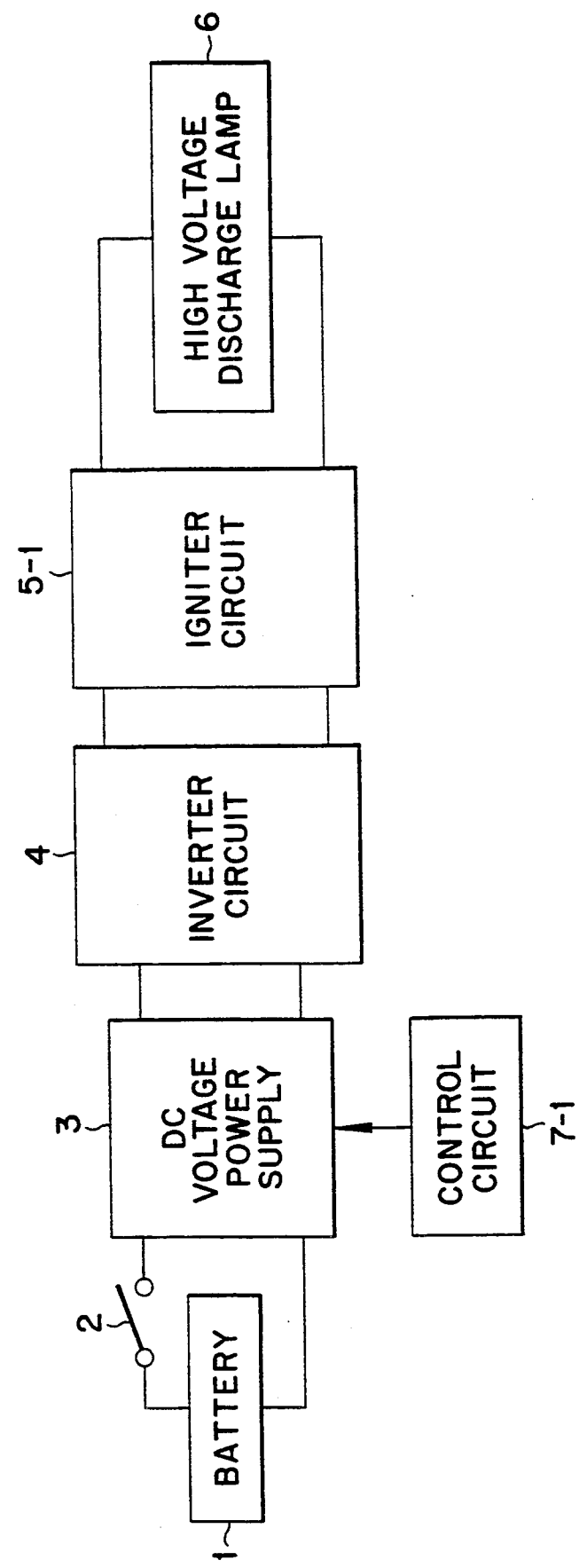
FIG. 13 is a block diagram of a first embodiment according to the conventional art.
Figure 14:
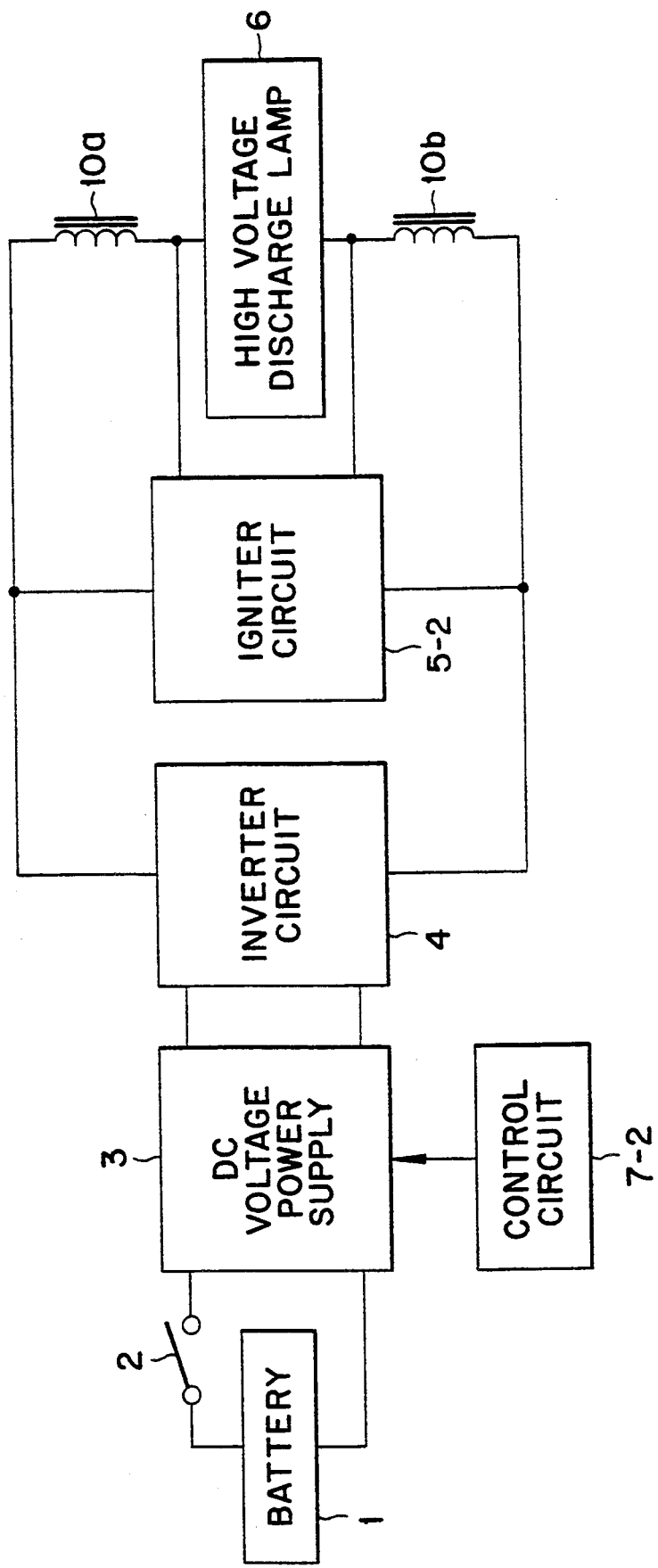
FIG. 14 is a block diagram of a second embodiment according to the conventional art.
Figure 15:
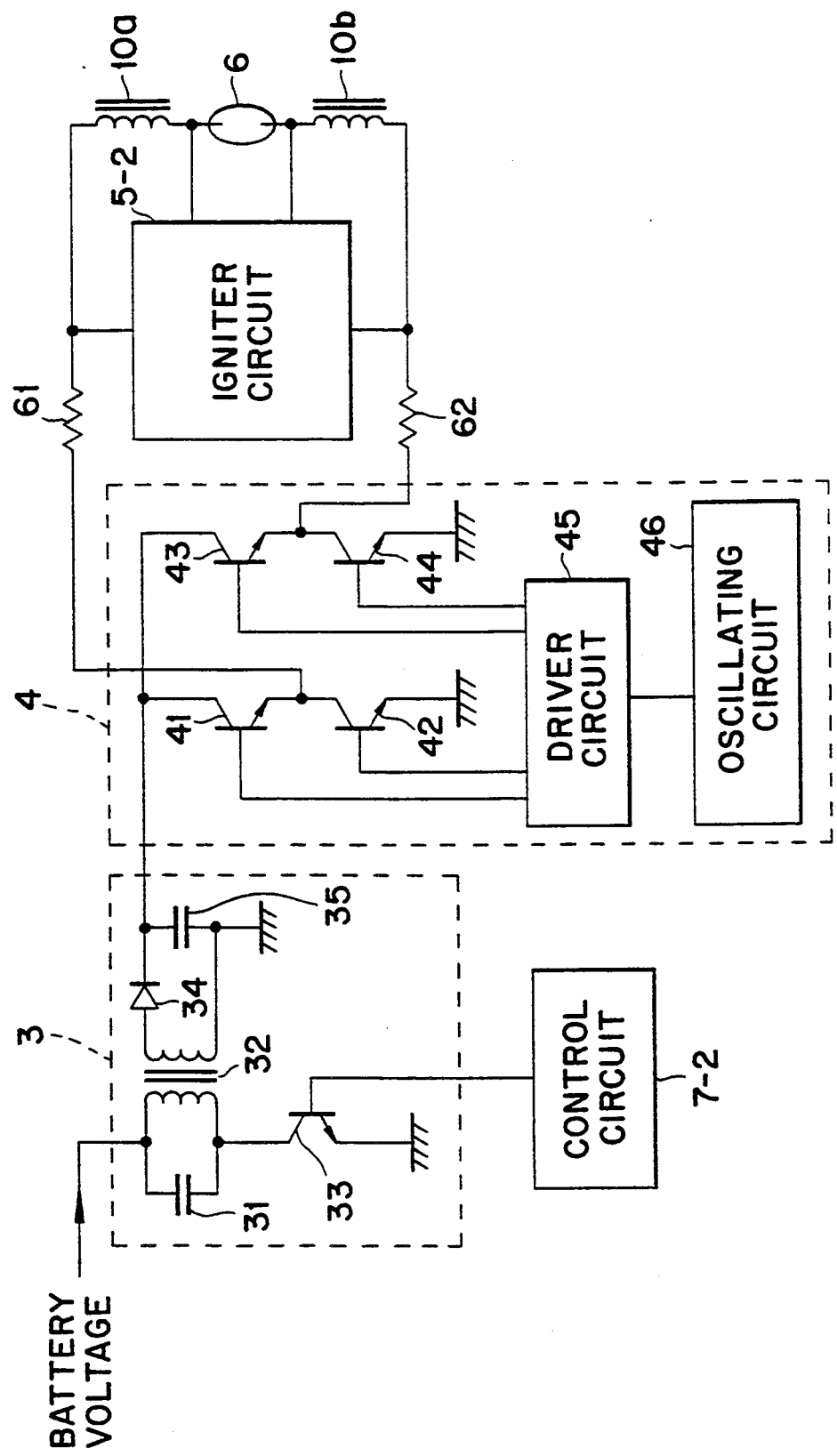
FIG. 15 is a block diagram showing a detailed circuit construction of the step-up DC-DC converter 3 and of an inverter circuit 4 of the conventional second embodiment shown in FIG. 14.

FIG. 2 is a block diagram showing the construction of FIG. 1, and FIG. 3 is a timing chart showing the operation thereof. As shown in FIG. 3, when a polarity switching means drive circuit 8 detects that a power switch 2 is changed from an off to an on state, it inverts the present state of the relay (not shown), and activates the polarity switching means 9a and 9b, which respectively are relay contacts, so as to switch the output polarities of the step-up DC-DC converter 3 in synchronization with the action of the power switch, and supply the polarities to the high voltage discharge lamp 6. The polarity switching means drive circuit 8 enables switching of the output polarities of the step-up DC-DC converter 3 by other methods as well such as synchronizing with the moment when the state of the power switch is changed from an on to an off state, the moment when the state thereof is set to on or set to off individually, or even with the moment when some signals relating to the power switch on/off operations are detected and so on. It is to be noted that other components in the same figure having the same reference numerals of the first embodiment of the conventional art, FIG. 13, function in the same way.

Figure 4:
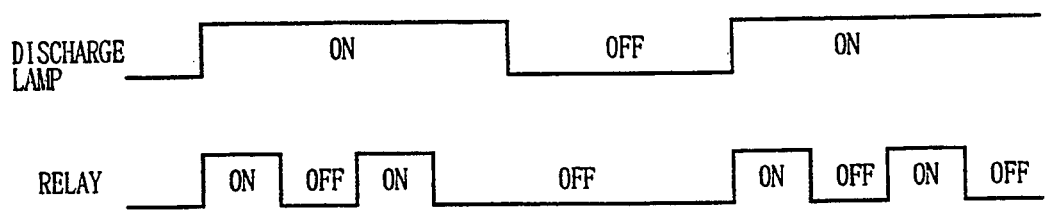
FIG. 4 is a modified timing chart of the first embodiment.

FIG. 4 is a timing chart which shows a slightly modified form of the above embodiment. As shown in the figure, the polarity switching means drive circuit 8 inverts the present state of the relay, for example at every 10 minutes in accordance with signals generated from a built-in ultra low-frequency oscillator irrespective of the on or off state of the power switch 2, whereby the output polarities of the step-up DC-DC converter 3 are alternatively switched and fed to the high voltage discharge lamp 6.

In this embodiment above, since no inverter circuit is adopted therein, and the polarity switching means switches the polarities of the step-up DC-DC converter 3 alternatively in synchronization with the action of the power switch or with low-frequency signals, the construction thereof may be very simple, thereby substantially reducing manufacturing costs.

Figure 5:
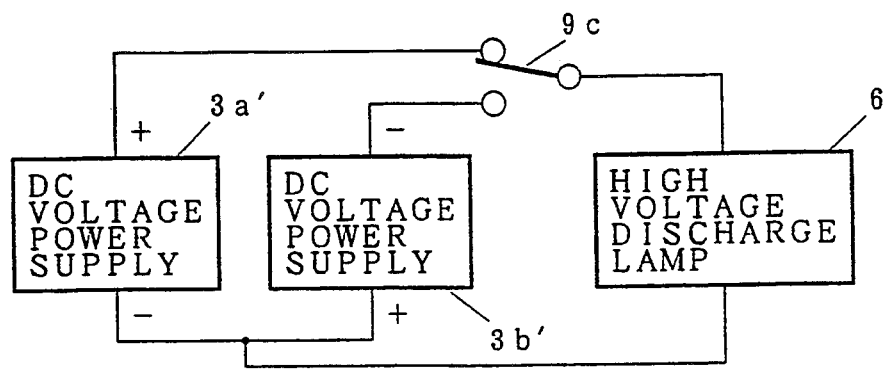
FIG. 5 is an illustration showing a general construction of a second embodiment according to the present invention.
Figure 6:
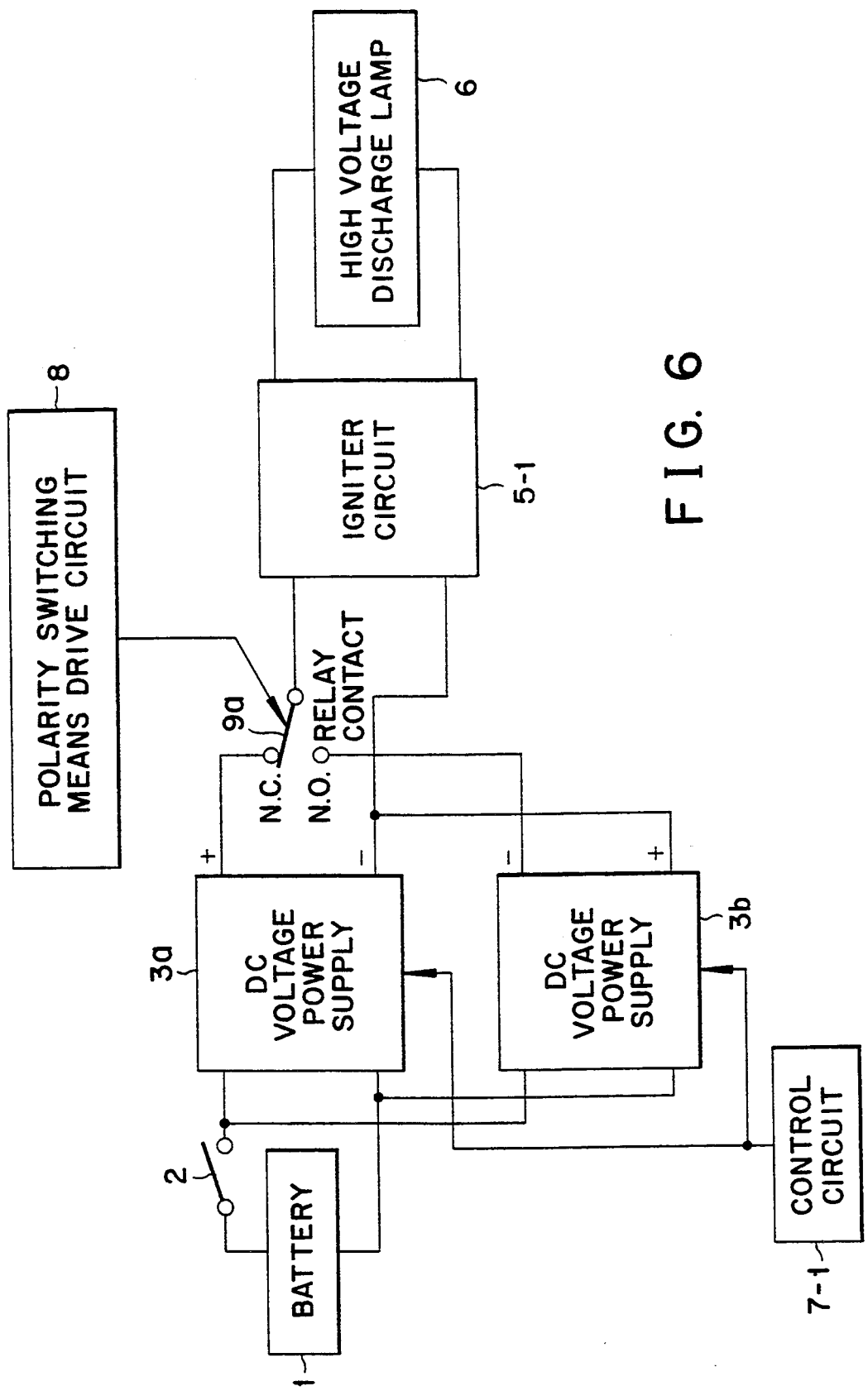
FIG. 6 is a block diagram of the second embodiment.

FIG. 5 is an illustration showing the second embodiment of the present invention, and FIG. 6 is a block diagram of this embodiment. In the second embodiment, the outputs from the two step-up DC-DC converters 3a and 3b whose output polarities are different from each other are alternatively switched by a polarity switching means 9c and fed to the high voltage discharge lamp 6. The construction and operation of the polarity switching means drive circuit 8 is the same as the first embodiment, and the same effect as the first embodiment.

Figure 7:
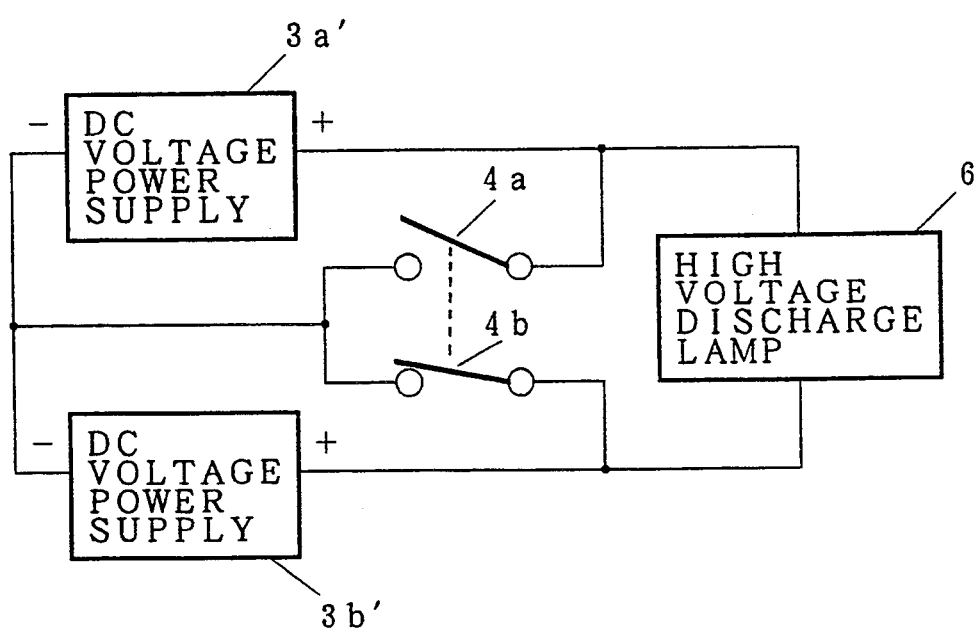
FIG. 7 is an illustration showing a general construction of a third embodiment according to the present invention.
Figure 8:
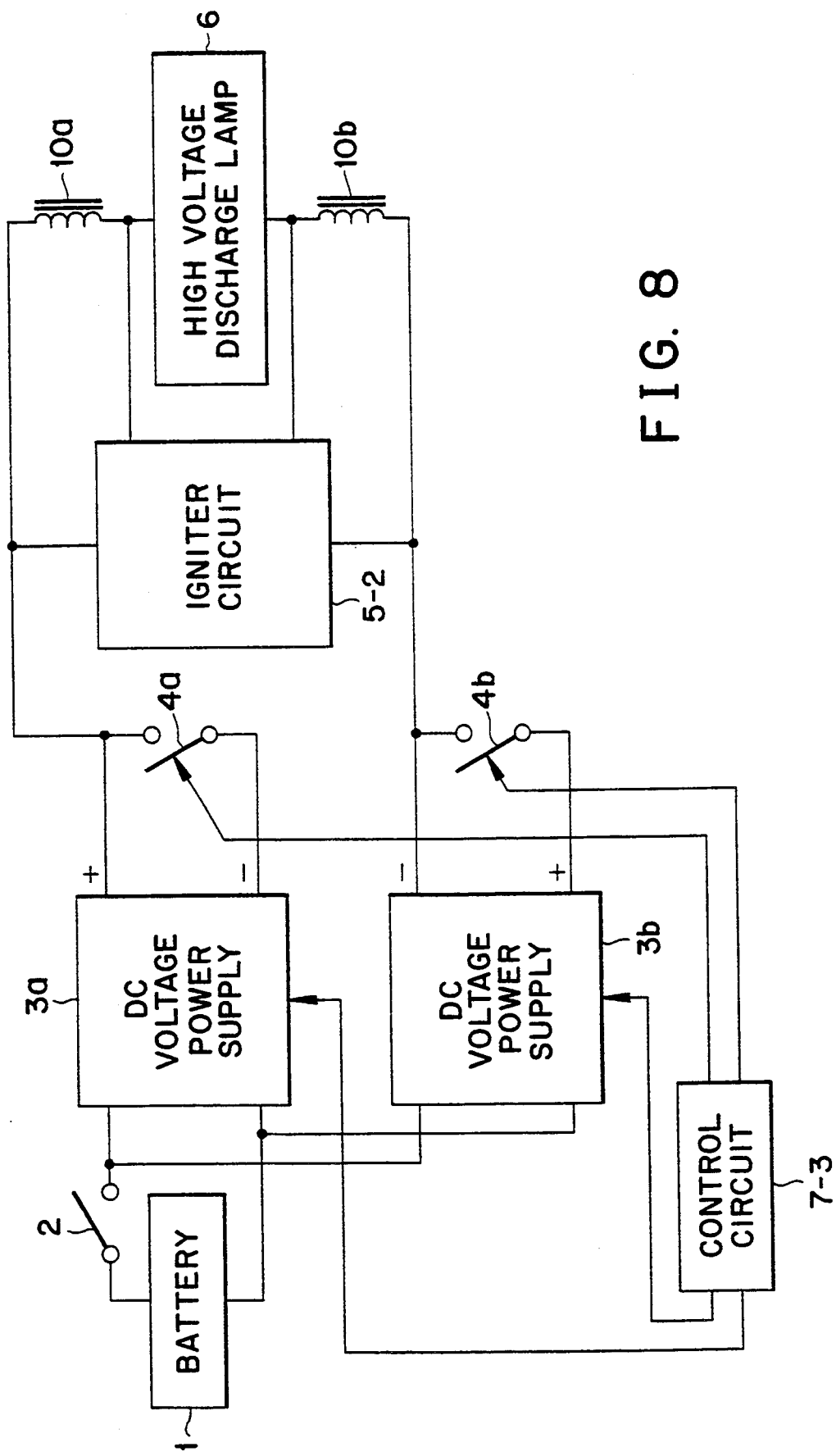
FIG. 8 is a block diagram of the third embodiment.

FIG. 7 is an illustration showing a general construction of the third embodiment of the present invention, and FIG. 8 is a block diagram of this embodiment. Here, reference numerals 3a and 3b are step-up DC-DC converters respectively, whose construction and operation are the same as the step-up DC-DC converter 3 of the second embodiment of the conventional art. Reference numerals 4a and 4b are polarity switching means respectively composed of switching elements such as a transistor or the like. A control circuit (including a polarity switching means drive circuit) 7-3 controls the outputs of the step-up DC-DC converters 3a and 3b, and also controls on/off states of the polarity switching means 4a and 4b.

Figure 9:
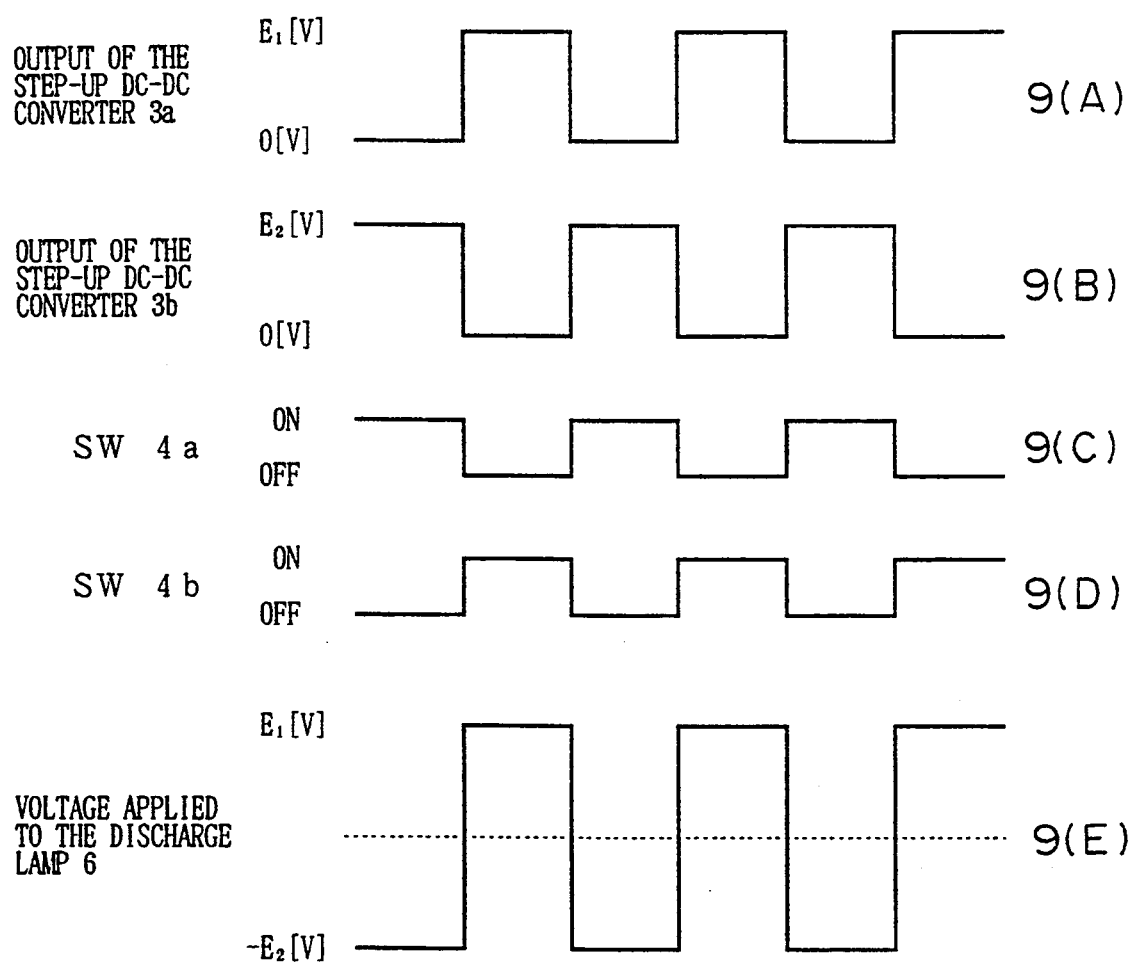
FIG. 9 is a timing chart showing the operation of each of the component blocks of the construction shown in FIG. 8.

FIG. 9 is a timing chart showing the operation of each of the component blocks of the third embodiment, wherein FIG. 9(A) represents a waveform of the step-up DC-DC converter 3a. The step-up DC-DC converter 3a outputs intermittently an electric voltage E1[V] at a low-frequency (for example 400 Hz), whereas FIG. 9(B) represents a wave form which is the same as FIG. 9(A) intermittently outputting an electric voltage E2[V]. FIGS. 9(C) and 9(D) represent on/off states of a polarity switching means 4a and of the other polarity switching means 4b respectively, wherein the polarity switching means 4a is set to the on state while the step-up DC-DC converter 3a is in operation, and the polarity switching means 4b is set to the on state while the step-up DC-DC converter 3b is in operation. FIG. 9(E) represents an electric voltage finally applied to the high voltage discharge lamp 6.

Figure 10:
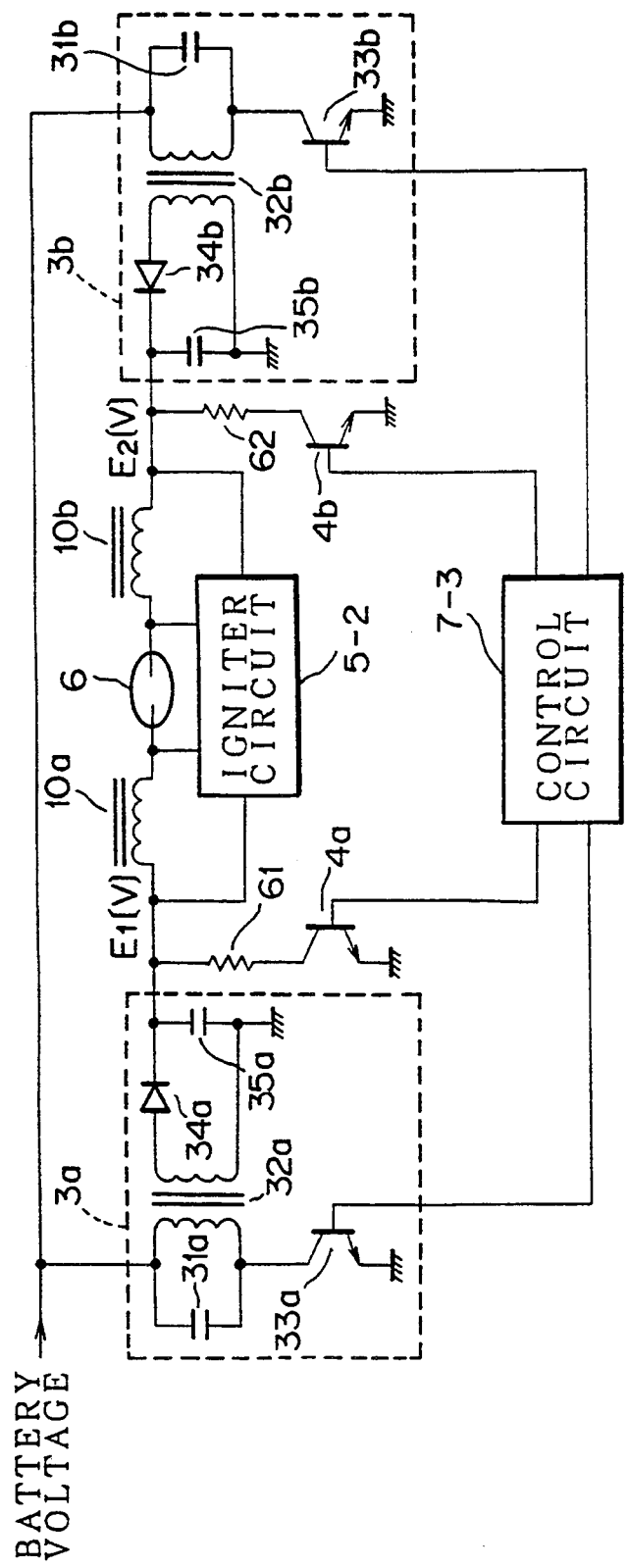
FIG. 10 is a block diagram showing a detailed circuit construction of the step-up DC-DC converters 3a, 3b and of the polarity switching means 4a and 4b.

FIG. 10 shows a detailed circuit construction of the step-up DC-DC converters 3a, 3b and the polarity switching means 4a, 4b, whereas FIG. 11 shows a timing chart thereof.

As shown in FIG. 11, the transistors 33a and 33b respectively operate at a high-frequency (for example 20 Khz) modulated by a low-frequency 400 Hz. Further, the transistor 4a is set to the on state while the transistor 33b is operating at a high-frequency, and conversely the transistor 4b is set to the on state while the transistor 33a is operating at a high-frequency. Therefore, the output voltage from the step-up DC-DC converter 3a generates an electric current in a closed circuit comprising the coil 10a, high voltage discharge lamp 6, coil 10b, a resistor 62 and the transistor 4b, wherein the resistor 62 limits the electric current. Likewise, the other step-up DC-DC converter 3b generates an electric current in a closed circuit comprising the coil 10b, the high-voltage discharge lamp 6, coil 10a, a resistor 61 and the transistor 4a. In other words, as shown by FIG. 11(G), a low-frequency alternating electric voltage is supplied to the high voltage discharge lamp 6.

Figure 12:
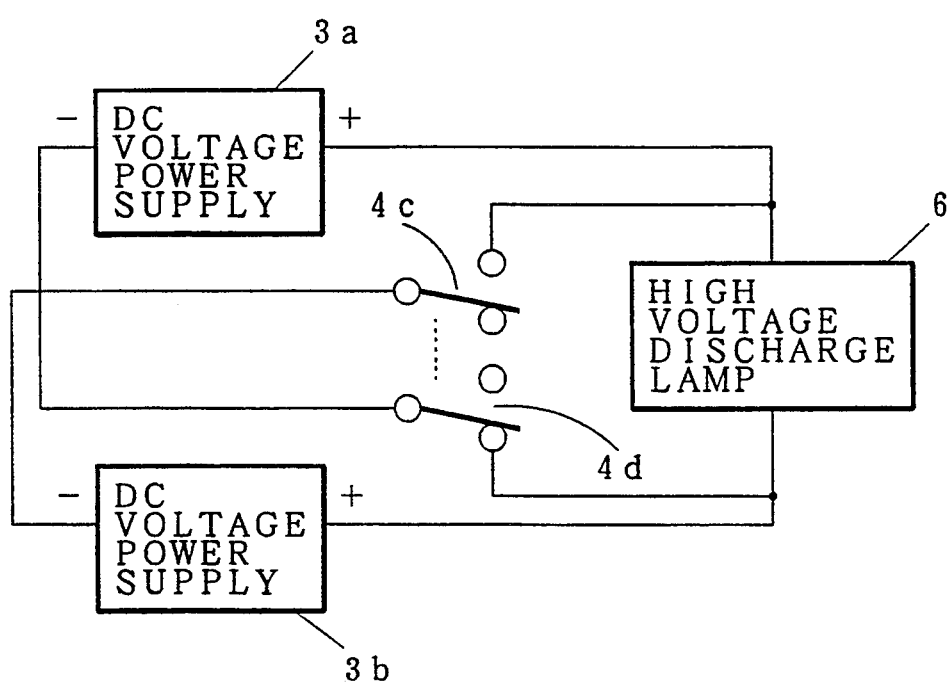
FIG. 12 is an illustration showing a modified general construction of the third embodiment.

If it is possible to separate one end of the output voltages of the respective step-up DC-DC converters 3a, 3b from ground, then the above third embodiment can be represented by the general construction shown in FIG. 12.

Thus, the same effect as the first embodiment can be obtained by this embodiment.

Although the polarity switching means are synchronized with the action of the power switch or with the ultra low-frequency signals generated from the oscillating circuit in the first and second embodiments, and are synchronized with low-frequency signals in the third embodiment, the present invention is not limited to those embodiments. Accordingly, it is also possible that the polarity switching means are synchronized with the low-frequency signals in the first and second embodiments, and that they are synchronized with the ultra low-frequency signals or the action of the power switch in the third embodiment.

In addition, the construction shown in FIGS. 5 and 12 can be modified such that one part of the step-up DC-DC converters 3a, 3b, for example the primary winding of the transformer, is common.

As described heretofore, the present invention requires no inverter circuit, and thus the construction thereof may be rather simple, so that the manufacturing cost thereof can be substantially reduced.

Although the invention has been described with a certain degree of particularity, obviously many changes and variations are possible therein. It is therefore to be understood that the invention may be practiced otherwise than specifically described herein without departing from the scope and spirit thereof.

What is claimed is:

1. A device for a high voltage discharge lamp comprising:
   first and second step-up DC-DC converters connected to a power switch for supplying a first electric voltage and a second electric voltage, respectively;
   relay contact switch means for alternatively switching between said first electric voltage and said second electric voltage, said first electric voltage having a polarity opposite to said second electric voltage; and
   control means for changing a switched state of said relay contact switch means independent of said power switch being turned on and off.

2. The device of claim 1, further including a built-in oscillating circuit, wherein said control means operates in synchronization with signals generated from said built-in oscillating circuit.

3. The device of claim 2, wherein said signals include ultra-low frequency signals.

4. The device of claim 2, wherein said signals include low-frequency signals.

5. The device of claim 3, wherein said ultra-low frequency signals have a period on the order of ten minutes.

6. A device comprising:
   first and second step-up DC-DC converters connected to a power switch for supplying a first electric voltage and a second electric voltage, respectively;
   polarity switching means comprising a pair of switching means for alternatively switching between said first electric voltage and said second electric voltage, said first electric voltage having a polarity opposite to said second electric voltage; and
   a control circuit for changing a switched state of said pair of polarity switching means, wherein said pair of switching means operates in synchronization with ultra-low frequency signals generated by said control circuit.

7. The device of claim 6, wherein said pair of switching means are transistors.

8. A device comprising:
   first and second step-up DC-DC converters connected to a power switch for supplying a first electric voltage and a second electric voltage, respectively, said first electric voltage having a polarity opposite to said second electric voltage;
   a first transistor and a second transistor, connected to said first step-up DC-DC converter and said second step-up DC-DC converter respectively, wherein said first transistor and said second transistor alternatively switch between a first switched state in which said first transistor is on and said second transistor is off and said second electric voltage is supplied to a lamp, and a second switched state in which said first transistor is off and said second transistor is on and said first electric voltage is supplied to said lamp; and
   a control circuit for changing between said first switched state and said second switched state.

* * * * *